Patented Nov. 18, 1924.

1,516,423

UNITED STATES PATENT OFFICE.

LUDWIG HEINRICH DIEHL, OF DARMSTADT, GERMANY.

PREPARATION AND SMELTING OF ORES, ROASTER RESIDUES, SLAGS, AND THE LIKE.

No Drawing.   Application filed November 17, 1923.   Serial No. 675,358.

*To all whom it may concern:*

Be it known that I, LUDWIG HEINRICH DIEHL, a German citizen, residing in Darmstadt, Germany, have invented certain new and useful Improvements in the Preparation and Smelting of Ores, Roaster Residues, Slags, and the like, of which the following is a specification.

This invention relates to an improvement upon or modification of, that described in United States Letters Patent No. 1,431,877.

The process described in the said Letters Patent for treating, for example, slags from lead and copper smelting furnaces containing more or less manganese, zinc, lead, silver and the like, in addition to iron, lime, magnesia, alumina, silica and other constituents of blast furnace slags, may consist in first desulphurizing the material and forming it into agglomerates or briquettes and then smelting the latter in a blast furnace with the addition of so much lime or limestone, coke and chlorides, that the iron is reduced to metallic iron and the zinc, lead and silver are volatilized and recovered in a product which is collected by washing the furnace gas in slightly alkaline water.

The reason why the furnace is operated under such conditions that the iron is reduced to metal is due to the fact that when this reduction occurs, substantially the whole of the zinc is volatilized from the material smelted, so that the yield of zinc is high.

It is an object of the present invention to conduct the smelting operation substantially without reducing the iron to metal. This reduction depends on the proportion of lime or equivalent base added to the charge. If this proportion is too small, reduction of the iron to metal does not occur. It was previously supposed that diminution of the proportion of lime or other base would prevent volatilization of zinc compounds, but I have found that by suitable adjustment of the proportion of chloride added to the charge, the proportion of lime or equivalent base may be reduced below that essential when the iron is to be reduced to metal and at the same time a profitable yield of zinc may be obtained. In other words, it is advantageous, when there is no market for iron, or when coke is costly, or the erection of plant for complete iron smelting is too expensive, to vary the proportions in the sense indicated and thus to leave the iron in the slag.

By this invention the proportions of lime and chloride added are such that the lime, together with so much of the base of the chloride used as will enter the slag, suffice to displace the volatile metals contained in the material so that they are wholly or in great part carried out of the furnace in the current of gas. At the same time the said proportions must be such as are necessary for a typical lead or copper furnace slag containing 25–40 per cent FeO, up to 30 per cent CaO and 27–35 per cent $SiO_2$, and the quantity of fuel must be so regulated that metallic iron is not obtained as a commercial product of the furnace, although occasionally reduction of some of the iron may occur.

It is preferable that the proportion of chloride should be such that the volatilized zinc will be in the form of a basic chloride.

The zinc product made by washing the gases with alkaline water as described in the aforesaid patent will, after it has been washed, be free or almost free from chlorine combined with zinc if the alkalinity of the wash water is low. In practice the alkalinity should not be much higher than that corresponding with about 0.1 to 0.2 per cent of CaO; the zinc sludge produced should be saturated with carbon dioxide, for instance with combustion gases from boilers or the like, and the soluble chlorine should be washed out on a leaf suction filter. In this manner a zinc product may be obtained containing only traces of chlorine combined with zinc, from which the combined chlorine can be removed by calcination; it is then eminently suitable for preparing solutions of zinc sulphate for the deposition of zinc electrolytically.

Since it is not proposed to obtain simultaneously commercial pig iron and a complete recovery of the zinc, it will not be necessary first to desulphurize the material treated, for instance slag can be smelted with chloride and lime or limestone or other suitable flux in the condition in which it is obtained from the lead or copper smelting furnaces, or the chloride can be added directly to an ore and flux charged into a furnace for the purpose of recovering zinc.

In order to recover the zinc oxide from lead or copper furnace slags, the following rule may be observed—add for every per cent of ZnO contained in the slag 0.8 to 1.0 per cent of NaCl and 1.0 to 0.8 per cent of high grade limestone, or correspondingly more of the latter, if it is not of the best quality.

The following example illustrates the actual operation. The slag used has the following average composition: $SiO_2$ 25–27 per cent. $Al_2O_3$ 6.5 per cent. FeO 31 per cent. MnO 5–5.5 per cent. ZnO 13 per cent. Pb 1.5 per cent. CaO 15.5–17 per cent. S 3–4 per cent.

1000 tons of the broken slag in lumps up to 3 inches are mixed with 117 tons of rock salt, 110 tons of good limestone and 150 tons of coke and smelted in a water jacket furnace with a shallow crucible over a bed of lead and matte. The smelting is conducted as when smelting an ordinary ore charge except that the charge is kept at the level of the feed floor and the top of the furnace is kept rather hot.

The blast used varies between 12 and 15 ounces per square inch. The fused and treated slag, together with the lead and matte, is tapped into a forehearth, where it is separated, and then run into slag pots in order to settle the remaining matte.

If the slag should become too limey, ironstone may take the place of the limestone, so as to keep the slag sufficiently fluid.

The zinc is carried out of the furnace in the gas, principally as a basic chloride, which partly settles in the flue, but is mainly recovered by passing the gas through wet fan gas washers and scrubbers. The water from these, with the zinc sludge, is run into settling tanks, in which it is kept slightly alkaline by adding a solution of thin milk of lime, and the clear overflow water from these tanks is returned to the gas washers.

If the smelting is properly conducted the quantity of zinc recovered exceeds 80 per cent of that contained in the slag, while a fairly large percentage of the lead and silver also contained therein is recovered as bullion and matte.

When smelting zinciferous ore charges the salt and lime are added in sufficient quantity to displace the zinc in the slags and ensure its expulsion in the furnace gas. When smelting ores with high zinc content it is sometimes necessary also to increase the ferrous oxide in the slag.

As a rule, the slags should contain $SiO_2$ between 27 and 35 per cent, CaO (incl. MgO) not to exceed 30 per cent, and FeO between 25 and 40 per cent, in addition to the other constituents of the ore charge, such as $Al_2O_3$, BaO, $BaSO_4$ and the like.

To facilitate the volatilization of the zinc as basic chloride, the presence of a fair proportion of CO in the gas is desirable. It is therefore advisable to use good porous furnace coke coked at a temperature not exceeding 650 to 800 degrees centigrade.

The quantity of coke required for smelting will depend on the composition of the charge. In addition thereto one ton of extra coke will be required for every 2 to 3 tons of zinc which are to be volatilized and removed from the furnace in the flue gases.

The weight of rock salt used should be about equal to one and a half times the weight of the zinc contained in the charge and proposed to be volatilized.

The smelting in the above described manner can be carried out in suitable shaft or blast furnaces of various construction, for instance iron blast furnaces, cupolas, lead or copper smelting blast furnaces or in reverberatory furnaces.

Having thus fully described the nature of my said invention and the best means I know for carrying the same into practical effect, I claim:—

1. The treatment of ores, slags or the like containing iron and zinc by smelting them in a furnace in presence of a chloride together with a proportion of calcareous base and coke in deficiency of that required to yield iron as a product of the furnace, and collecting the zinciferous material carried out of the furnace by the gases.

2. The treatment of ores, slags or the like containing iron and zinc by smelting them in a furnace in presence of a chloride together with a proportion of lime and coke in deficiency of that required to yield iron as a product of the furnace, and collecting the zinciferous material carried out of the furnace by the gases.

3. The treatment of ores, slags or the like containing iron and zinc by smelting them in a furnace in presence of a chloride together with a proportion of calcareous base and coke in deficiency of that required to yield iron as a product of the furnace, washing the gases from the furnace by means of an alkaline wash water, collecting the sludge thus obtained, then carbonating the sludge, then washing out of the sludge the soluble chlorides by means of water and finally calcining the sludge to obtain a zinc product.

4. The treatment of ores, slags or the like containing iron and zinc by smelting them in a furnace in presence of a chloride together with a proportion of calcareous base and coke in deficiency of that required to yield iron as a product of the furnace, washing the gases from the furnace by means of wash water of alkalinity less than equivalent to 0.1 to 0.2 per cent of CaO, collecting the sludge thus obtained, then carbonating the sludge, then washing out of the sludge the soluble chlorides by means of water and finally calcining the sludge to obtain a zinc product.

5. The treatment of ores, slags or the like containing iron and zinc by smelting them in a furnace in presence of a chloride together with a proportion of lime and coke in deficiency of that required to yield iron as a product of the furnace, washing the gases from the furnace by means of an alkaline wash water, collecting the sludge thus obtained, then carbonating the sludge, then washing out of the sludge the soluble chlorides by means of water and finally calcining the sludge to obtain a zinc product.

6. The treatment of ores, slags or the like containing iron and zinc by smelting them in a furnace in presence of a chloride together with a proportion of calcareous base and coke in deficiency of that required to yield iron as a product of the furnace, washing the gases from the furnace by means of wash water of alkalinity less than equivalent to 0.1 to 0.2 per cent of CaO, collecting the sludge thus obtained, then carbonating the sludge, then washing out of the sludge the soluble chlorides by means of water and finally calcining the sludge to obtain a zinc product.

In testimony whereof I have signed my name to this specification.

LUDWIG HEINRICH DIEHL.